Sept. 11, 1951        E. A. TURNER        2,567,357

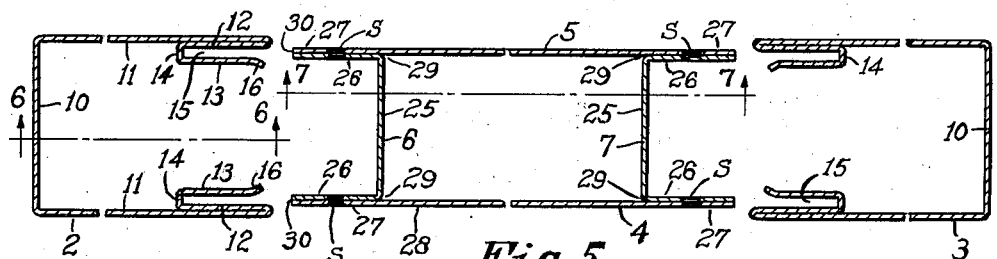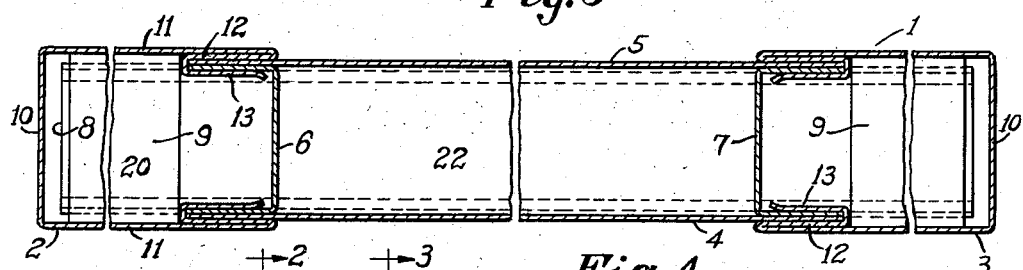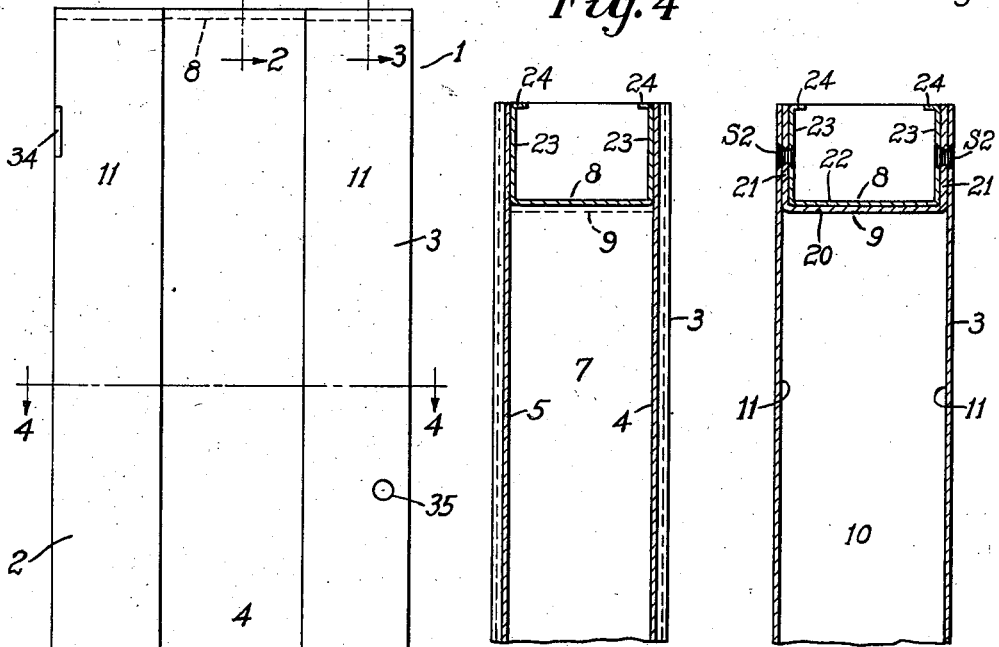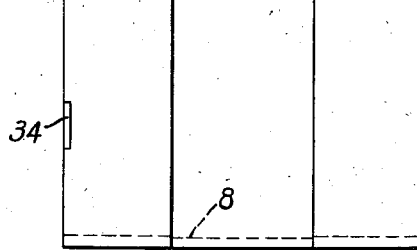

HOLLOW METAL DOOR CONSTRUCTION

Filed Jan. 14, 1948        2 Sheets-Sheet 2

Inventor

*Edward A. Turner*

By *Freas and Bishop*

Attorneys

Patented Sept. 11, 1951

2,567,357

UNITED STATES PATENT OFFICE 2,567,357

HOLLOW METAL DOOR CONSTRUCTION

Edward A. Turner, North Canton, Ohio, assignor to Diebold, Incorporated, Canton, Ohio, a corporation of Ohio Application January 14, 1948, Serial No. 2,156

5 Claims. (Cl. 189—46)

The invention relates to hollow metal doors, and more particularly to hollow sheet metal doors of flush or modified flush type construction.

Practical and serviceable flush type hollow sheet metal doors, to be competitive with wooden doors, must be light in weight, stiff and strong, low in cost, and attractive in appearance.

Accordingly it is a primary object of the present invention to substantially reduce the cost of manufacturing, shipping, and installing hollow metal doors and to provide a construction which is light in weight and stiff and strong.

Furthermore, it is an object of the present invention to provide a new hollow sheet metal door construction which eliminates the use of bolts, rivets, tie rods, inner frames, vertical and cross-bracing, and the like.

Moreover, it is an object of the present invention to provide a new, stiff and strong, light gauge, hollow sheet metal door structure in which the elements thereof are assembled by spot welding without visible spot welds on the faces of the door except immediately adjacent the top and bottom edges thereof, so as to provide clean, smooth and unmarred panel faces which may be easily painted substantially without any surface finishing and at a minimum painting cost.

Also it is an object of the present invention to provide a new flush type hollow sheet metal door construction comprising an extremely small number of component parts each of which has a very simple flat or channel-shaped form.

In addition, it is an object of the present invention to provide a new flush type hollow sheet metal door construction in which complicated tooling and special fixtures are not required for assembling and spot welding the component parts of the door together.

Also it is an object of the present invention to provide a new flush type hollow sheet metal door construction which may be fabricated from very thin gauge sheet metal and assembled from few component parts each having an extremely simple design by simple and inexpensive operations, and in which the door size may be changed by the mere change of the cut length or width of certain of the component parts so that doors of different sizes may be readily fabricated without separate sets of dies for each door size and without changing dies.

These and other objects and advantages apparent to those skilled in the art from the following description and claims may be obtained, the stated results achieved, and the described difficulties overcome, by the devices, constructions, arrangements, combinations, sub-combinations, parts, elements, methods, and method steps which comprise the present invention, a preferred embodiment of which—illustrative of the best mode in which applicant has contemplated applying the principles—is set forth in the following description and shown in the drawings, and are particularly and distinctly pointed out and set forth in the appended claims forming a part hereof.

By way of example, a preferred embodiment of the improved flush type sheet metal door construction is illustrated in the accompanying drawings forming part hereof wherein:

Figure 1 is a front elevation of the improved door construction;

Fig. 2 is an enlarged fragmentary section looking in the direction of the arrows 2—2, Fig. 1;

Fig. 3 is an enlarged section similar to Fig. 2 taken on the line 3—3, Fig. 1;

Fig. 4 is an enlarged fragmentary cross section of the improved door construction looking in the direction of the arrows 4—4, Fig. 1;

Fig. 5 is an expanded view similar to Fig. 4 showing the hinge and lock stile members and the panel box structure prior to assembly;

Similar numerals refer to similar parts throughout the drawings.

Figure 6:
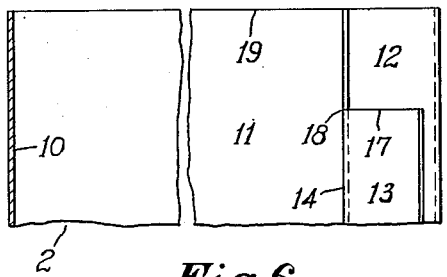
Fig. 6 is a fragmentary cross section of the upper end of one of the stile members looking in the direction of the arrows 6—6, Fig. 6.

The improved door construction is indicated generally by 1 and is shown somewhat diagrammatically in Fig. 1, and in more detail in the other views of the drawings, and includes a hinge stile member 2, a lock stile member 3, a front panel sheet or face plate 4, a rear panel sheet or face plate 5, panel spacer channel members 6 and 7, top and bottom end channel members 8, and top and bottom filler channel members 9. From a structural standpoint the parts of the door consist solely and only of the enumerated stile members, panel face plates, and channel members. Each of the members and plates 2, 3, 4, 5, 6, 7, 8, and 9 have a simple or elementary shape from a manufacturing standpoint.

Referring more particularly to Fig. 5, the stile members 2 and 3 as shown have the same transverse cross sectional shape and are formed from rolled sheet or strip metal blanks, preferably rolled steel blanks, by simple sheet metal bending and shearing steps.

Each stile member 2 and 3 when formed to final shape has a channel web wall 10 and spaced channel leg walls 11. Each leg wall 11 at its outer marginal edge has a first reversely bent inwardly extending portion 12 and a second reversely bent outwardly extending portion 13 with a short connecting web portion 14 between the reversely bent portions, whereby longitudinal grooves 15 are formed within the channel stile members 2 and 3 adjacent the outer edge of each leg wall between the reversely bent portions 12 and 13. If desired, the free edges of the portions 13 may be flared slightly at 16, as shown.

Each stile member 2 and 3 is formed from a flat rectangular blank, each corner of which is sheared to form a right angled notch, so that in its final shape each end edge 17 and 18 of the groove forming portions 13 and 14, respectively, are spaced longitudinally inwardly from the adjacent end edge 19 of the connected channel leg wall 11, as shown in Fig. 6.

Each filler channel member 9 is preferably rectangular as shown, and includes a web wall 20 which fits the space between the preferably parallel leg walls 11 of each stile member 2 or 3, and each filler channel member 9 further includes opposite leg walls 21 extending in the same direction from the side edges of the web wall 20, and in the assembled door the outer faces of the web walls 21 of each filler channel member 9 abut the inner faces of the channel leg walls 11 at one end of one of the stile members 2 or 3.

Each end channel member 8 is preferably rectangular as shown and includes a web wall 22 from the side edges of which extend in the same direction leg walls 23, and the outer edge of each leg wall 23 may if desired be provided with an inwardly extending flange 24. In the final assembly of the door 1, each end portion of one of the channel members 8 fits in one of the filler channel members 9, the outer face of each leg wall 23 abutting the inner face of one of the leg walls 21 of one of the filler channel members 9.

Each panel spacer channel member 6 and 7 has the same preferably rectangular transverse cross section as shown, and each includes a web wall 25 from the outer edges of which extend in the same direction leg walls 26, the leg walls 26 being spaced the same distance from each other as the leg walls 23 of each end channel member 8.

Each panel face plate 4 and 5 is preferably rectangular as shown, and each includes longitudinally extending opposite marginal edge portions 27.

In the manufacture of the door 1, a sub-assembly constituted a panel box structure indicated generally by 28 in Fig. 5, is formed by arranging the spacer channel members 6 and 7 with their leg walls 26 extending in opposite directions from each other, placing the marginal portion 27 of the panel face plate 4 with its inner face abutting the outer face of the leg wall 26 of the channel member 6 at one side, and placing the other marginal portion 27 of the panel face plate 4 with its inner face abutting the outer face of the similar leg wall 26 of the channel member 7. Each marginal portion 27 of the panel face plate 4 is then connected preferably by spot welds S to the abutting leg walls 26. Each marginal portion 27 of the other panel face plate 5 is similarly placed and connected to an abutting leg wall 26 of one of the channel members 6 and 7. The panel box structure 28 thus includes an elongated four-sided body having spaced and opposite walls formed by the face plates 4 and 5 between which extend the spaced and opposite walls constituted by the web walls 25 of the channel members 6 and 7, and at each longitudinal corner 29 of the panel box structure 28 there projects outwardly a double thickness flange 30.

Thus at each of two opposite longitudinally extending sides of the panel box structure 28 there is a set of two laterally spaced longitudinally extending flanges 30, the lateral spacing of each set of flanges being equal to the lateral spacing between each set of grooves 15 in one of the stile members 2 or 3.

Figure 7:
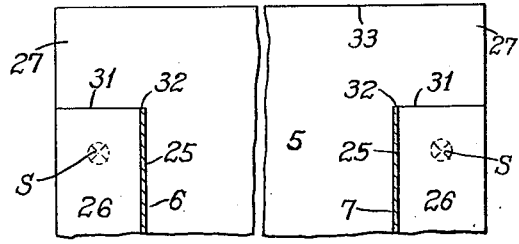
Fig. 7 is a fragmentary sectional view of the upper end of the panel box structure taken on the line 7—7, Fig. 5.
Figure 8:
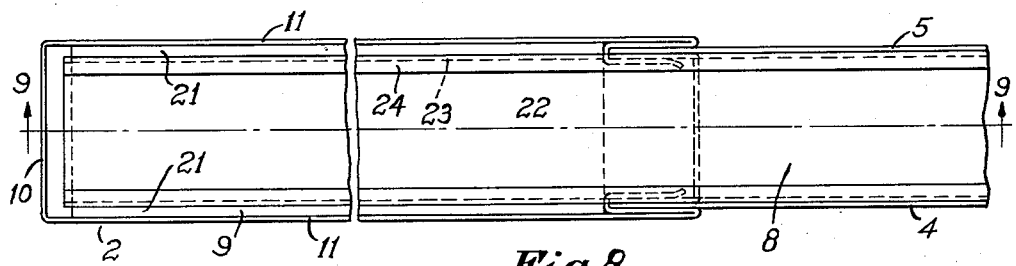
Fig. 8 is a fragmentary top plan view of one top corner of the improved door construction.

As shown in Fig. 7 each spacer channel member 6 and 7 terminates at each end in an end edge 31 for each leg wall 26 and a coextensive end edge 32 for the web wall 25. Each panel face plate 4 and 5 has at each end an edge 33, and the end edges 31 and 32 at each end of each spacer channel member 6 and 7 are spaced respectively from the adjacent end edges 33 of the plate 4 or 5 a distance equal at least to the depth of the legs of one of the end channel members 8.

In the further assembly of the panel box structure 28, at each of its ends, one of the end channel members 8 is laid between end portions of the panel face plates 4 and 5 with the web wall 22 of the channel member 8 located adjacent and preferably against the end edges 31 and 32 of the channel members 6 and 7. The central portions of the leg walls 23 lie between and have outer faces abutting inner faces of the end portions of the panel face plates 4 and 5, as best shown in Fig. 2, each set of abutting leg walls 23 and end wall portions of the panel face plate 4 or 5 being connected to each other, preferably by spot welds S1.

Equal end portions of each channel member 8 extend beyond opposite sides of the panel box structure 28 a distance slightly less than the depth of the leg walls 11 of the stile members 6 and 7, and each such end portion of each channel member 8 fits in one of the filler channel members 9, all of the leg walls of the thus assembled channel member 8 and channel members 9 extending outwardly.

Figure 9:
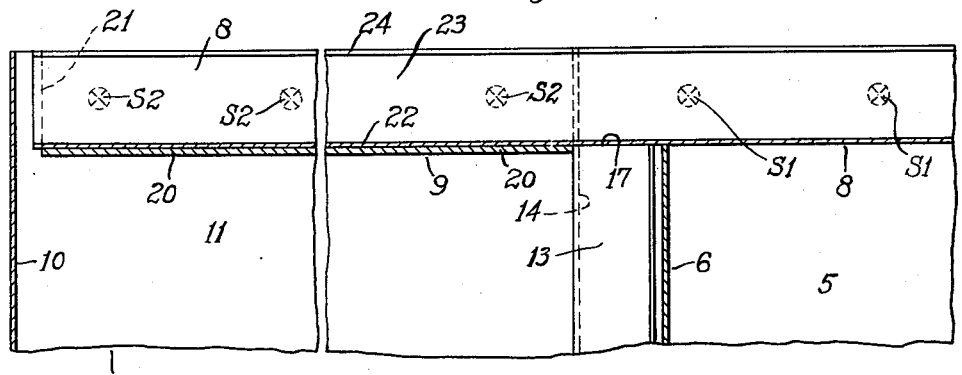
Fig. 9 is a fragmentary sectional view looking in the direction of the arrows 9—9, Fig. 8.

After the panel box structure 28 has been thus produced, it is assembled and connected with the stile members 2 and 3, as follows: The outer faces of the leg walls 21 of each filler channel member 9 abut against inner faces of end portions of one of the leg walls 11 of one of the stile members 2 or 3; and each flange 30 fits into one of the grooves 15; and each set of abutting leg walls 23, 21, and 11 are secured to each other preferably by spot welds S2, as shown in Figs. 3 and 9.

From a broader standpoint, the channel members 6 and 7 and the channel members 8 constitute a set of oppositely spaced frame side members and a set of oppositely spaced frame end members bordering a four-sided area, each frame member having a channel form including a web wall and outwardly extending leg walls, and each frame end member 8 having opposite end portions each projecting laterally beyond one of the frame side members 6 or 7. The plates 4 and 5 and their spot weld connections with the leg walls of the channel members 6, 7, and 8 constitute means including plates connecting the frame members with each other and entirely covering the four-sided area and forming a panel box structure. Each stile member 2 and 3 constitutes a stile structure formed with grooves and pockets at the ends of the grooves, the grooves containing and covering the leg walls or flanges of one of the channel frame side members and the pockets containing and covering the end portions of the channel frame end members projecting beyond said channel frame side member. The spot welds between the leg walls of the stile members 2 and 3 and the projecting end portions of the channel frame end members 8 constitute connections between the stile structures and the projecting end portions of channel frame end members contained in the pockets of the stile structures.

Referring to Fig. 1, openings of the desired size, location and shape may be formed as indicated at 34 in the hinge stile member 2 for securing hinges to the formed door; and openings indicated at 35 of the desired size, location and shape likewise may be formed in the lock stile member 3 for receiving the door handle, latch and lock parts.

The particular arrangement and shape of the members and plates 2, 3, 4, 5, 6, 7, 8, and 9 is an important aspect of the present invention. Thus the stile members 2 and 3 may be formed to channel shape and the reversely bent portions 12, 13 and 14 may also be formed by simple press die operations; and the corner notches 17—18, and the hinge and lock openings 34 and 35 may be punched or knocked out on the same or similar press die by simple operations. Finally, the flat sheet blanks from which the stile members are formed may be trimmed for size by simple shearing operations.

Similarly, the face plates 4 and 5 are rectangular sheet members which may be trimmed for size by simple shearing operations.

Also, the channel members 6, 7, 8, and 9 may each be formed from sheet blanks by trimming for size and then forming on a press die or brake by simple operations.

The present invention enables a very strong, stiff and rigid flush type hollow metal door to be made at very low cost out of sheet steel as thin as 20 gauge metal, except for the filler channels 9 which must be formed of somewhat heavier metal to fill the space between the walls 11 of the stile members 2 and 3 and the ends of the channel members 8. Thus a very light weight metal door may be made which can be readily handled and quickly installed competitive with wooden doors from weight and installation price standpoints.

Accordingly, the present invention provides an improved hollow metal door construction which is very economical to make, which avoids visible spot welding except at the top and bottom of the door, which provides clean, smooth and unmarred surfaces for painting, which avoids die marks on the panel surface of the door also contributing to ease of painting and minimum painting expense, which reduces to a minimum the number of spot welds and component parts required, which avoids special or complicated tooling or fixtures for spot welding and assembly, and which is substantially directly competitive, pricewise, with wooden door constructions.

The embodiment of the present improvements is illustrated and described herein by way of example and scope of the present invention is not limited to the exact details of construction of the various parts. Thus, although each of the panel sheets 4 and 5 have been illustrated as solid sheets, louvers for ventilation may be formed therein if desired, or glass window openings or lights may be mounted therein in a usual manner.

In the foregoing description certain terms have been used for brevity, clearness and understanding; but no unnecessary limitations are to be implied therefrom beyond the requirements of the prior art, because such words are used for descriptive purposes herein and not for the purpose of limitation, and are intended to be broadly construed.

Having now described the features of the invention, the manufacture of a preferred embodiment thereof, and the advantageous, new and useful results obtained by the improved door structure; the new and useful devices, constructions, arrangements, combinations, subcombinations, parts and elements, and reasonable mechanical equivalents thereof obvious to those skilled in the art are set forth in the appended claims.

I claim:

1. In door construction and the like, laterally spaced channel frame side members having outwardly extending leg walls, rectangular plates connected at their side marginal portions to said leg walls, stile structures associated with the frame side members and having grooves receiving the leg walls and the connected marginal plate portions of the frame side members, the ends of said frame side members being cut off to form pockets within the ends of the stiles, and channel frame end members having their legs connected to the end marginal portions of said plates, said frame end members extending laterally through said pockets and connected to said stiles.

2. In door construction and the like, laterally spaced channel frame side members having outwardly extending leg walls, rectangular plates connected at their side marginal portions to said leg walls, channel-shaped stile structures associated with the frame side members and each having a web and spaced legs, the legs being reversely bent inwardly and outwardly to form longitudinal grooves receiving the leg walls of the channel frame side members and the marginal plate portions connected thereto, the ends of the frame side members being cut off to form pockets within the ends of the stiles, and channel frame end members having their legs connected to the end marginal portions of said plates, said frame end members extending laterally through said pockets and connected to said stiles.

3. In door construction and the like, laterally spaced channel frame side members having outwardly extending leg walls, rectangular plates connected at their side marginal portions to said leg walls, channel-shaped stile structures associated with the frame side members and each having a web and spaced legs, the legs having reversely bent inwardly and outwardly extending portions forming longitudinal grooves receiving the leg walls of the channel frame side members and the marginal plate portions connected thereto, the ends of the frame side members and the outwardly extending portions of the stile legs being cut off to form pockets within the ends of the stiles, and channel frame end members having their legs connected to the end marginal portions of said plates, said frame members extending laterally through said pockets and connected to said stiles.

4. In door construction and the like, laterally spaced channel frame side members having outwardly extending leg walls, rectangular plates connected at their side marginal portions to said leg walls, stile structures associated with the frame side members and having grooves receiving the leg walls and the connected marginal plate portions of the frame side members, the ends of said frame side members terminating short of the ends of the plates to form pockets within the ends of the stiles, and channel frame end members having outwardly extending legs connected to the end marginal portions of said plates, said frame end members extending laterally through said pockets and connected to said stiles.

5. In door construction and the like, laterally spaced channel frame side members having outwardly extending leg walls, rectangular plates connected at their side marginal portions to said leg walls, channel-shaped stile structures associated with the frame side members and each having a web and spaced legs, a set of groove-forming walls within the stile channels at the outer edge of each leg thereof receiving the leg walls of the channel frame side members and the marginal plate portions connected thereto, said groove-forming walls terminating within the stiles to form pockets, and channel frame end members having their legs connected to the end marginal portions of said plates, said frame end members extending laterally through said pockets and connected to said stiles.

EDWARD A. TURNER.

REFERENCES CITED

The following references are of record in the file of this patent:

UNITED STATES PATENTS

| Number | Name | Date |
|---|---|---|
| 1,574,493 | Leonard | Feb. 23, 1926 |
| 2,482,592 | Miller et al. | Sept. 20, 1949 |

FOREIGN PATENTS

| Number | Country | Date |
|---|---|---|
| 577,709 | Great Britain | May 29, 1946 |
| 588,157 | Great Britain | May 15, 1947 |
| 787,977 | France | Oct. 2, 1935 |